March 28, 1944.  A. G. PFEIFER  2,345,424
COMBINATION GAUGE
Filed April 28, 1942
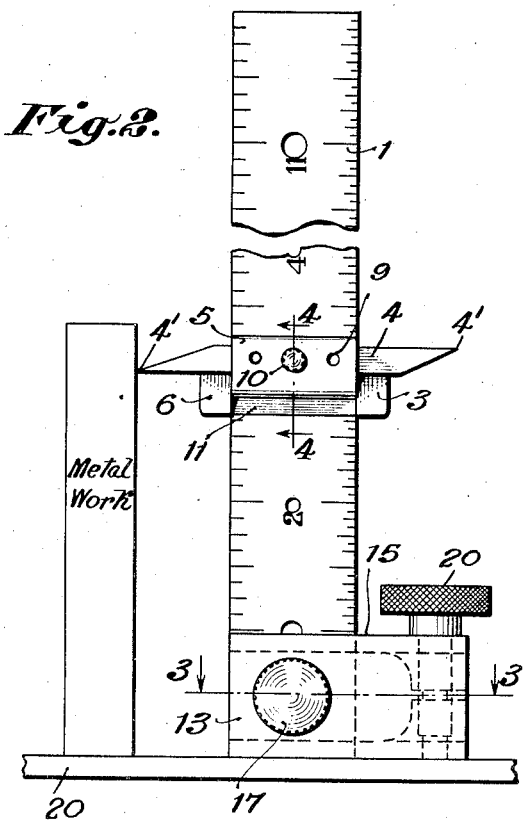
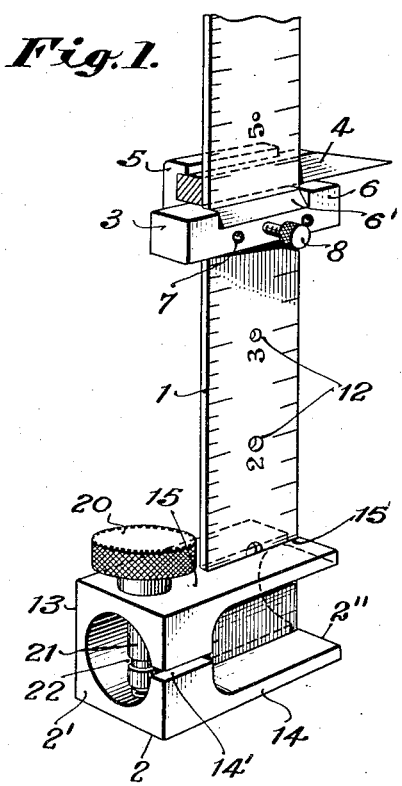
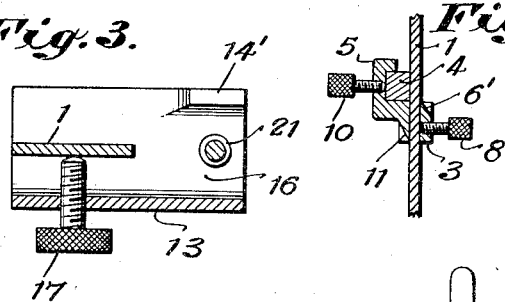
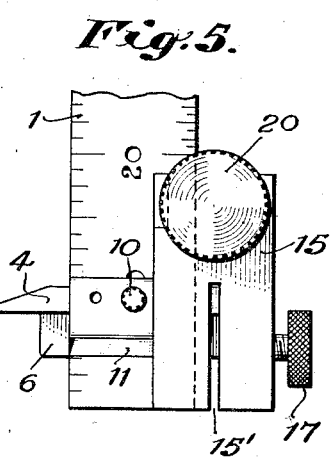
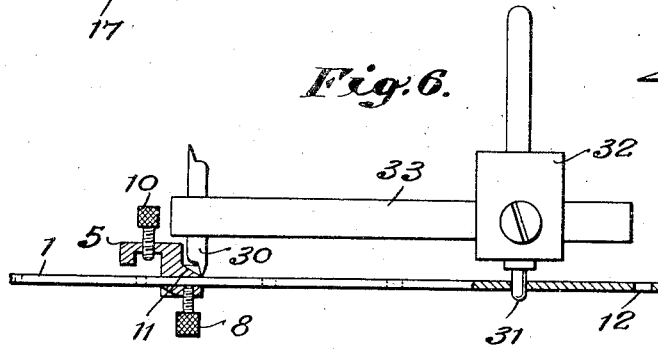
INVENTOR
Alfred G. Pfeifer
BY
Abraham S. Greenberg
ATTORNEY Patented Mar. 28, 1944

2,345,424

UNITED STATES PATENT OFFICE 2,345,424

COMBINATION GAUGE

Alfred G. Pfeifer, New York, N. Y.

Application April 28, 1942, Serial No. 440,760

2 Claims. (Cl. 33—169)

My present invention relates to a combination gauge, and more particularly to an instrument adapted to function as a surface, height or flycutter gauge.

The usual surface gauge requires the use of a scale or some other standard to set the point of the scriber at a given height. The mechanic must, in that case, use a separate scale in addition to the surface gauge. For small work the instrument is particularly difficult to manipulate, often requiring excessive painstaking care on the part of the user of the gauge.

One of the main objects of my present invention is to provide a combination surface and height gauge, especially adapted for use by tool and die makers, machinists, instrument makers and pattern makers.

Another important object of my invention is to provide a gauge which consists of a base, a scale and an adjustable scriber; the base having one portion thereof constructed to act as a clamping support for the scale used as a surface and height gauge, and the base having a second portion thereof constructed to permit the scriber to be effectively used for small work.

Another object of my invention is to provide a height gauge whose scale is provided with means for receiving different sizes of pilot pins of flycutters thereby permitting the scale and adjustable scriber holder to function as a gauge for flycutter settings.

Still other objects of the invention are to improve gauges of the height and surface type, and more particularly to provide such a gauge in a simple, efficient, economical and readily manufacturable form.

The novel features which I believe to be characteristic of my invention are set forth in particularity in the appended claims; the invention itself, however, as to both its organization and method of operation will best be understood by reference to the following description taken in connection with the drawing in which I have indicated diagrammatically several constructions whereby my invention may be carried into effect.

In the drawing:

Fig. 1 shows a perspective view of the gauge.

Fig. 2 shows the gauge in working position, the gauge being swung around from the position of Fig. 1 towards the plane of the drawing, Fig. 3 is a section taken along line 3—3 of Fig. 2, looking in the direction of the arrows, Fig. 4 is a section taken along line 4—4 of Fig. 2, looking in the direction of the arrows, Fig. 5 illustrates the gauge base arranged to permit the adjustable scriber to be used for small work, Fig. 6 shows the manner of using the scale as a flycutter setting gauge.

Referring now to the accompanying drawing, wherein like reference characters in the different figures indicate similar constructional elements, Fig. 1 shows the general elements comprising the present device. The scale 1 is provided with a removable base 2. The latter may be made of brass, or any other suitable metal. The base is constructed so that the scale may be secured thereto in either of two positions of the base. Figs. 1 and 2 show one position of the base and attached scale, while Fig. 5 shows the second, or upright, position of the base. In the latter position of the base the scriber support 3 may be adjusted for small work.

Considering Fig. 1 again, the scriber 4 is shown as having a tapered end terminating in a knife edge. The opposite end is similarly constructed, but in the reverse sense. These opposed knife edges are designated 4', and are shown in Fig. 2. In Fig. 1 one of the tapered ends has been broken away to reveal the square cross-sectional configuration of the scriber, as well as the retaining wall 5 of the support 3. The support 3 is longitudinally adjustable along the scale 1. The entire support 3 may be made of brass or tool steel, as may be the scriber 4. The support 3 generally has a configuration as shown in Fig. 1; the cross-sectional shape is shown in Fig. 4. The support has a central slot through which passes the scale.

The ends of the support extend beyond the parallel scale edges. One face 6 of the support is provided with a plurality of threaded taps 7 which are equally spaced. A support-adjusting screw 8 may be inserted in any desired one of the taps 7 to secure the support 3 in a desired position along scale 1. There may be used but one tap, centrally located, if desired. A plurality of taps is provided to insure flexibility of use for the device. The face 6 has its upper edge tapered, as at 6' in Fig. 4, to permit accuracy of setting of the scriber. The opposite face of the support has the wall 5 projecting therefrom. The wall 5 has an inverted L-shaped cross-section, as shown at Fig. 4; there is thus provided a slot to receive the scriber 4. The vertical section of wall 5 is provided with uniformly spaced, threaded taps 9 adapted to receive the adjusting screw 10.

The screw 10, when adjusted in a clockwise direction, serves to clamp the body of scriber 4 against the scale 1. The wall 5 tapers off, as at 11, so as to permit the scriber to be accurately adjusted when viewed in the position shown in Fig. 2. Of course, only a single tap 9 need be employed in wall 5, but the plurality of taps permit the scriber-securing screw to be located at any point along the width of wall 5. The scale 1 is of the usual form, with graduations in the accepted manner. However, the scale is constructed to have a plurality of apertures 12. These apertures are located at intervals of one inch along the median longitudinal line of the scale. Preferably, they increase in diameter from the central position of the scale to the extremities thereof. The function of these apertures will be presently described.

Considering, now, the structure and functions of base 2, it is first pointed out that the latter generally is made from a prism of square cross-section. The metal prism is hollowed out so that one end thereof 2' (see Fig. 1) has a circular opening therein; the opposite end 2" has an arch-like opening therein. The rear wall 13 of the base is unbroken, while the wall 14 opposite is provided with an arch opening. The arch opening of wall 14 communicates with the face 2' by a slot 14'. The slot 14' is formed by cutting through the central portion of the section of wall 14 above the arch.

The distance between the opposed clamp faces, providing the slot 14', is equal to the thickness of the scale 1. The slot 14' receives one extremity of the scale when the base is arranged as in Fig. 5; that is, the face 2" serving as the bottom end of the base. It will be noted that slot 14" is located on a median line of wall 14. The arch opening in wall 14 is of a considerable length; sufficient to permit the scriber support to be adjusted therein for at least one inch of the lower extremity of the scale.

The remaining two opposed walls 15 and 16 have aligned slots cut in them. In Fig. 5 there is shown the slit 15' in wall 15; the corresponding slit in wall 16 is of exactly the same height and width. The slits 15' are of sufficient length to receive the lower extremity of scale 1 when the base is lying on its wall 16. This is clearly shown in Figs. 1 and 2. It will be noted that (see Fig. 2) the arch opening in wall 14 is considerably longer than the slits 15'.

To securely retain, or fix, the scale in position with the one extremity located in the slits 15', there is provided a threaded clamping screw 17 whose threaded stem is received in a threaded tap provided in wall 13. The tap in wall 13 is provided at the median line of wall 13, and centrally of the width of scale 1 when the latter is inserted in the slits 15'. Proper rotation of the knurled head of screw 17 causes the end of the screw to clamp the lower extremity of the scale to the base. In this position of the base and scale the device is readily used as an accurate and easily-adjustable height gauge as shown in Fig. 2.

In the latter figure the base is shown lying on wall 16; the "1 inch" end of the scale is clamped in position between slits 15'. The lower edge of the vertical scale is flush with the outer face of wall 16. The base is shown resting on a work-table 20 upon which stands a metal work piece. It is desired to mark off accurately a certain height on the work. It is merely necessary to adjust the scriber support 3 to the desired height. This is done by adjusting the support, after loosening screw 8, along the scale until the taper edge of face 6 reaches the required height. The scriber knife edge 4' (left edge in Fig. 2) is now at the correct height. The screw 8 is now tightened. The work can now be scribed, as indicated in Fig. 2.

Should it be desired to use the gauge for small work, it is only necessary to place the base in the upright position of Fig. 5. In this position the lower dimension extremity of the scale is inserted into slit 14'. The screw 17 is rotated until its stem is well out of the path of the right end of the scriber support 3. A clamp screw is provided to cause the scale to be gripped firmly between the vise elements spaced by slit 14'. The clamp screw has an adjusting head 20 and a stem 21 which terminates in a threaded tip. The threaded tip of the clamp screw screws into a corresponding threaded tap in the wall 16. The stem 21 is unthreaded from the head to the threaded tip; it is provided with a groove, or recess, 22 in alignment with the slit 14'.

Before the lower dimension end of the scale is clamped into position as shown in Fig. 5, the scriber carrier 3 is slipped off the scale. When the scale is inserted into position, the inside edge thereof is moved into contact with groove 22. Upon rotation of the head 20 clockwise, the scale is firmly gripped between the vise elements since the screw acts to pull them together to a sufficient extent to clamp the scale. The scriber carrier 3 may now be slipped on the section of the scale between the slit 14' and the lower face 2". In other words, the scriber carrier may be reciprocated along the section of scale 1 located within the arch in wall 14. It will now be seen that scriber 4 may be adjusted for scribing small work. Fig. 5 shows the face 5 of the carrier 3; the screw 10 being used to clamp the scriber 4. The other face 6 will be used to set the scriber (see Fig. 1) at the desired height.

It will now be seen that my combined gauge device is readily useful for surface or height gauge work; for small work; for any other gauge work there a scriber needs to be set at a measured point of machine work. However, the device is capable of still another use. Fig. 6 shows how the scale 1 and carrier 3 may be used as a flycutter gauge. A flycutter is well known in the machining art; the cutter is designated by numeral 30. The pilot pin 31 is secured to a socket 32 within which the cutter arm 33 is adjustable. To set the cutter 30 at the proper distance from pin 31, the pin is inserted in the aperture 12 of proper diameter. Those skilled in the art know that flycutters are of different pilot pin sizes. Hence, the apertures 12 are arranged in the order of successively decreasing diameters from the extremities. Thus, a pair of decreasing-sized apertures 12 are provided; this is shown in Fig. 6

The scriber 4 is removed, and the tapered edge 11 of the carrier may be used to set the cutter 30 at a desired distance from the pin 31. If the opposite series of apertures is employed to seat the pilot pin 31, then the tapered edge of face 6 may be used to set the cutter 30. Of course, the scriber 4, which is of hard tool steel, may be used as cutter 30 if desired. Such a gauge device is of great utility in an experimental laboratory, or any machine shop; the economy of providing this type of gauge in combination with the convertible base 2 will be obvious.

While I have indicated and described several constructions for carrying my invention into effect, it will be apparent to one skilled in the art that my invention is by no means limited to the particular constructions shown and described, but that many modifications may be made without departing from the scope of my invention, as set forth in the appended claims.

What I claim is:

1. A hollow gauge block of substantially square cross-section, one end of the block being provided with an arch-like opening, one wall of the block being provided with a narrow slit which widens into a wide arch, said narrow slit and said arch communicating with the hollow interior of the block, the planes of said arch and said arch-like opening being at right angles, opposed walls on opposite sides of said one wall, and a clamping means located between said opposed walls.

2. In a height gauge of the type provided with a scale, a prismatic base having a hollow interior, one wall of the base being provided with a narrow slit which widens into an arch, said slit and arch both communicating with said interior, said arch being longer than the narrow slit, two opposed walls on either side of the one wall, and clamping means operatively associated with said opposed walls to the rear of said narrow slit for securing said scale extremity when positioned in said narrow slit and arch.

ALFRED G. PFEIFER.